US010261252B2

(12) United States Patent
Guerber et al.

(10) Patent No.: US 10,261,252 B2
(45) Date of Patent: Apr. 16, 2019

(54) OPTICAL COUPLING DEVICE WITH A WIDE BANDWIDTH AND REDUCED POWER LOSSES

(71) Applicant: STMicroelectronics (Crolles 2) SAS, Crolles (FR)

(72) Inventors: Sylvain Guerber, Brie Et Angonnes (FR); Charles Baudot, Lumbin (FR); Florian Domengie, Crolles (FR)

(73) Assignee: STMicroelectronics (Crolles 2) SAS, Crolles (FR)

(*) Notice: Subject to any disclaimer, the term of this patent is extended or adjusted under 35 U.S.C. 154(b) by 0 days.

(21) Appl. No.: 16/133,064

(22) Filed: Sep. 17, 2018

(65) Prior Publication Data
US 2019/0018191 A1    Jan. 17, 2019

Related U.S. Application Data

(63) Continuation of application No. 15/692,571, filed on Aug. 31, 2017, now Pat. No. 10,101,528.

(30) Foreign Application Priority Data

Feb. 20, 2017 (FR) ..................... 17 51328

(51) Int. Cl.
*G02B 6/26* (2006.01)
*G02B 6/122* (2006.01)
(Continued)

(52) U.S. Cl.
CPC .......... *G02B 6/1228* (2013.01); *G02B 6/126* (2013.01); *G02B 6/13* (2013.01); *G02B 6/138* (2013.01);
(Continued)

(58) Field of Classification Search
CPC .... G02B 6/14; G02B 6/1228; G02B 6/12007; G02B 6/125; G02B 6/262; G02B 6/26; B82Y 20/00
See application file for complete search history.

(56) References Cited

U.S. PATENT DOCUMENTS 7,251,386 B1    7/2007 Dickinson et al.
7,650,050 B2*   1/2010 Haffner .................. B82Y 20/00
                                           250/231.19
(Continued)

OTHER PUBLICATIONS

INPI Search Report and Written Opinion for FR 1751328 dated Oct. 23, 2017 (9 pages).
(Continued)

*Primary Examiner* — Jennifer Doan
(74) *Attorney, Agent, or Firm* — Crowe & Dunlevy

(57) ABSTRACT

A photonic integrated circuit includes an optical coupling device situated between two successive interconnection metal levels. The optical coupling device includes a first optical portion that receives an optical signal having a transverse electric component in a fundamental mode and a transverse magnetic component. A second optical portion converts the transverse magnetic component of the optical signal into a converted transverse electric component in a higher order mode. A third optical portion separates the transverse electric component from the converted transverse electric component and switches the higher order mode to the fundamental mode. A fourth optical portion transmits the transverse electric component to one waveguide and transmits the converted transverse electric component to another waveguide.

16 Claims, 3 Drawing Sheets

(51) Int. Cl.
  *G02B 6/43* (2006.01)
  *G02B 6/30* (2006.01)
  *G02B 6/14* (2006.01)
  *G02B 6/138* (2006.01)
  *G02B 6/13* (2006.01)
  *G02B 6/126* (2006.01)
  *G02B 6/12* (2006.01)

(52) U.S. Cl.
  CPC ............... *G02B 6/14* (2013.01); *G02B 6/262* (2013.01); *G02B 6/305* (2013.01); *G02B 6/43* (2013.01); *G02B 6/12002* (2013.01)

(56) References Cited

U.S. PATENT DOCUMENTS 8,110,823 B2   2/2012   Bowers
9,733,428 B2   8/2017   Hackler, Sr. et al.
2006/0062540 A1*   3/2006   Zoorob .................. B82Y 20/00
              385/147
2015/0338577 A1   11/2015   Shi et al.
2016/0131837 A1   5/2016   Mahgerefteh et al.

OTHER PUBLICATIONS

Feng, Ning-Ning et al: "Low-Loss Compact-Size Slotted Waveguide Polarization Rotator and Transformer," 2007 Optical Society of America, Optics Letters, vol. 32, No. 15, Aug. 1, 2007, pp. 2131-2133.

Picard, Marie-Josee, et al: "CMOS-Compatible Spot-Size Converter for Optical Fiber to Sub-µm Silicon Waveguide Coupling With Low-Loss Low-Wavelength Depedence and High Tolerance to Misalignment," Proceedings of SPIE, vol. 9752, 97520W-1, 2016 (7 pages).

* cited by examiner

OPTICAL COUPLING DEVICE WITH A WIDE BANDWIDTH AND REDUCED POWER LOSSES

CROSS-REFERENCE TO RELATED APPLICATION

This application is a continuation of U.S. application for patent Ser. No. 15/692,571 filed Aug. 31, 2017, which claims the priority benefit of French Application for Patent No. 1751328, filed on Feb. 20, 2017, the disclosures of which are hereby incorporated by reference in their entireties to the maximum extent allowable by law.

TECHNICAL FIELD

Modes of implementation and embodiments relate to integrated photonic circuits, and in particular to the coupling of input devices, such as optical fibers, to this type of circuit, and most particularly the coupling of optical fibers used for the transmission of signals over long distances.

BACKGROUND

Transceivers based on optical fibers allow the transmission of signals over long distances. They conventionally use frequency multiplexing so as to be able to transmit/receive several signals with a single optical fiber. They therefore transmit signals in a wide band of frequencies.

However, today's coupling devices are in general tailored to suit a restricted range of frequencies.

Moreover, an optical signal travelling in a conventional optical fiber is polarized in a random manner, that is to say the orientation of its electric field is random. Also, an optical signal travelling in a conventional waveguide of an integrated circuit, that is to say a waveguide of rectangular cross section, allows polarization of the light signal in two directions only. The first direction, called transverse electric (TE polarization), is defined as parallel to the layers of the integrated circuit, for example parallel to the buried insulating layer in technologies of silicon on insulator type. The second direction, called transverse magnetic (TM polarization), is defined as being orthogonal to the first direction. Certain photonic hardware components are particularly suitable for signals polarized in a transverse electric manner, and other photonic hardware components are particularly suitable for signals polarized in a transverse magnetic manner. Other hardware components can receive signals polarized in either way.

Various means exist for coupling an input/output device to an integrated circuit.

A first solution consists in coupling the input/output device on the upper face of the integrated circuit, and of transmitting the signal to the waveguide by way of a grating-type coupler.

This solution makes it possible to transmit the transverse electric component of the optical signal as well as the transverse magnetic component via its conversion into a transverse electric component. However, this transmission is done only over a very small optical bandwidth. Consequently a non-negligible part of the optical power, sometimes greater than 50%, may be lost.

A second solution consists in coupling the input/output device on a lateral face of the integrated circuit and makes it possible to transmit a signal polarized in the transverse electric direction and in the transverse magnetic direction.

However, the existing solutions are expensive since they require the implementation of specific methods of fabrication, and they do not allow sufficient confinement of the transverse magnetic component, thus giving rise to diffusion of the signal into the carrier substrate of the integrated circuit and therefore optical power losses.

It is therefore desirable to limit the diffusion of the transverse magnetic component into the carrier substrate.

SUMMARY

Thus, according to one embodiment, there is proposed a device for coupling an input device to an integrated circuit allowing the transmission of a signal of wide bandwidth, whose optical power losses are reduced, and which is independent of the wavelength of the signal.

Moreover, this coupling device can be produced by conventional fabrication methods.

According to one aspect, there is proposed a photonic integrated circuit comprising a substrate surmounted by an interconnection region comprising several metal levels, at least two waveguides, and at least one coupling device situated between two successive metal levels of said interconnection region and comprising: a first portion coupled to a lateral face of the photonic integrated circuit and configured to receive an incident optical signal, said signal comprising a transverse electric component in a fundamental mode and a transverse magnetic component, a second portion coupled to the first portion and configured to convert the transverse magnetic component of the incident signal into a converted transverse electric component in a higher-order mode, a third portion configured to separate the transverse electric component, here in its fundamental mode, and the converted transverse electric component, here in a higher-order mode, so as to switch the converted transverse electric component into a fundamental mode, and a fourth portion configured to transmit the transverse electric component and the converted transverse electric component to said at least two waveguides.

Thus, by converting the transverse magnetic component, one avoids the losses that it would have engendered by its diffusion especially in the buried insulating layer of the integrated circuit when the substrate of the integrated circuit is a substrate of Silicon On Insulator (SOI) type, while preserving the corresponding power in converted form.

Also, switching the converted transverse electric component into a mode different from the fundamental mode makes it possible in particular to prevent the two components of the signal from interfering with one another, which would give rise to power losses, or indeed cancellation of the signal in the most unfavorable cases.

According to one embodiment, the first portion comprises a slot waveguide comprising a first upper band, a first lower band having a first optical index, and a first intermediate band situated between the first upper band and the first lower band and having a second optical index lower than the first optical index.

This makes it possible advantageously to confine the transverse magnetic component in the first portion of the coupling device, so as to reduce the power losses due to the diffusion of the signal in the buried insulating layer.

According to one embodiment, the first portion comprises a first end situated at the level of said lateral face, and the first lower band and the first intermediate band have a length greater than the length of the first upper band and extend from the first end. The first upper band extends onwards of a non-zero distance from the first end.

The first portion can have an increasing width and comprise a first end situated at the level of said lateral face and having a first width, and a second end having a second width, the first width being smaller than the second width.

This makes it possible advantageously to tailor the optical index progressively in such a way as to limit the optical power losses due, for example, to reflections of the signal.

According to one embodiment, the second portion comprises a polarization rotator comprising a second upper band, a second lower band and a second intermediate band, the second upper band and the second intermediate band forming a prolongation of the first upper band and of the first intermediate band from the second end of the first portion and have a decreasing width so as to attain a smaller width than the second width at an end of the second portion, and the second lower band forms a prolongation of the first lower band from the second end of the first portion and has an increasing width so as to attain a third width at the end of the second portion.

The third width can be chosen in such a way that the converted transverse electric component is in an optical mode of order one.

According to one embodiment, the third portion comprises a third lower band and a lateral band which are produced side by side, the third lower band forming a prolongation of the second lower band and comprises a first sub-portion of constant width, the lateral band being of constant width, the third portion being configured to implement a directional coupling of the converted transverse electric component so as to switch the converted transverse electric component into a fundamental mode.

According to a variant, the third portion can comprise a third lower band and a lateral band which are produced side by side, the third lower band forming a prolongation of the second lower band and comprising a second sub-portion of decreasing width, the lateral band being able to comprise a third sub-portion of increasing width, the second sub-portion and the third sub-portion being opposite one another, and the third portion being configured to implement an adiabatic coupling of the converted transverse electric component so as to switch the converted transverse electric component into a fundamental mode.

Thus, the adiabatic coupling is possible for signals in a wide range of frequencies, thereby making it possible to couple optical signals independently of their frequency.

The width of the lateral band can be chosen in such a way that the converted transverse electric component can travel therein in its fundamental mode.

The fourth portion can be configured to transmit the transverse electric component to a first waveguide and the converted transverse electric component to a second waveguide.

This makes it possible advantageously to preserve the power of both components, especially in the case where their combining would generate interference.

The fourth portion can comprise a first prolongation of the third lower band parallel to the first waveguide and situated above the latter in such a way that said first prolongation and the first waveguide are suitable for the implementation of an adiabatic coupling, and a second prolongation of the lateral band parallel to the second waveguide and situated above the latter in such a way that said second prolongation and the second waveguide are suitable for the implementation of an adiabatic coupling.

The intermediate bands can be made of silicon nitride, silicon dioxide, or aluminum nitride, and the other bands of amorphous silicon.

This exhibits the advantage, since amorphous silicon supports temperatures of up to 500 degrees and since the temperatures used during the production of the interconnection part do not exceed 450 degrees, of allowing the integration of the device into the interconnection part.

Moreover, because of the high optical index of amorphous silicon, this allows a more significant confinement of the optical signal in the device.

BRIEF DESCRIPTION OF THE DRAWINGS

Other advantages and characteristics of the invention will become apparent on examining the detailed description of embodiment of the invention, wholly non-limiting, and the appended drawings in which.

DETAILED DESCRIPTION

Figure 1:
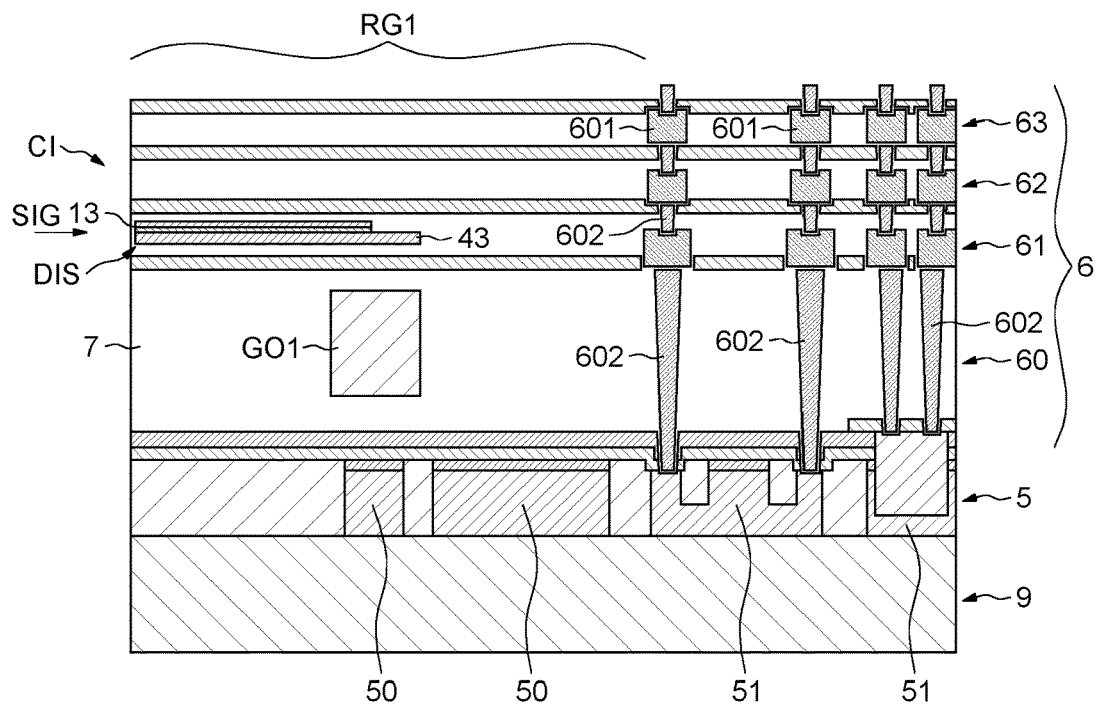
FIG. 1 is a transverse sectional view of a photonic integrated circuit.

FIG. 1 is a transverse sectional view of a photonic integrated circuit according to one embodiment.

The integrated circuit comprises a semi-conducting substrate or film 5 comprising diverse active hardware components 51 and passive hardware components 50, which is produced on a buried insulating layer 9 commonly referred to by the person skilled in the art by the acronym BOX ("Buried OXide"), which is itself produced on a carrier substrate (not represented).

The semi-conducting substrate 5 is surmounted by an interconnection region 6 (or BEOL, "Back End Of Line" according to the acronym well known to the person skilled in the art), comprising several metal levels 60, 61, 62, 63.

Each metal level comprises one or more metallic tracks 601, encased in an insulating material or Inter-Metal Dielectric (IMD), here silicon dioxide. The metal tracks are connected together and to the active hardware components by vias 602 and make it possible to ensure the connection between the various active hardware components 51 produced in the substrate 5.

Furthermore, each metal level is delimited at the level of its upper and lower faces by a silicon nitride protection layer, making it possible to avoid the diffusion of the metal of the metallic tracks into the silicon dioxide during their production.

Each metal level conventionally has here a height of close to three hundred and fifty nanometers.

The interconnection part 6 comprises on a first level 60 a first waveguide GO1 and a second waveguide GO2 (not represented in FIG. 1), produced in a region RG1 of the interconnection part devoid of metal.

The second metal level 61 comprises here a coupling device DIS produced between two metal levels 61 and 62, and extending from a lateral face 7 of the integrated circuit CI.

The terms "between two metal levels" must be understood here as meaning "situated between the planes containing the lower surfaces of the metallic tracks of two successive metal levels".

Thus, the device DIS is situated here between the metal levels 61 and 62. In a variant, it could equally well have been produced between all other successive metal levels without this affecting the operation.

It should be noted that although for the sake of simplification the first waveguide GO1 has been represented as extending perpendicularly to the plane of FIG. 1 and the device DIS has been represented as extending parallel to the plane of FIG. 1, in practice these two elements may extend along parallel directions.

The coupling device DIS is configured to receive an optical signal SIG originating for example from an input/output device, for example an optical fiber, and to transmit it to the waveguides GO1 and GO2.

Figure 2:
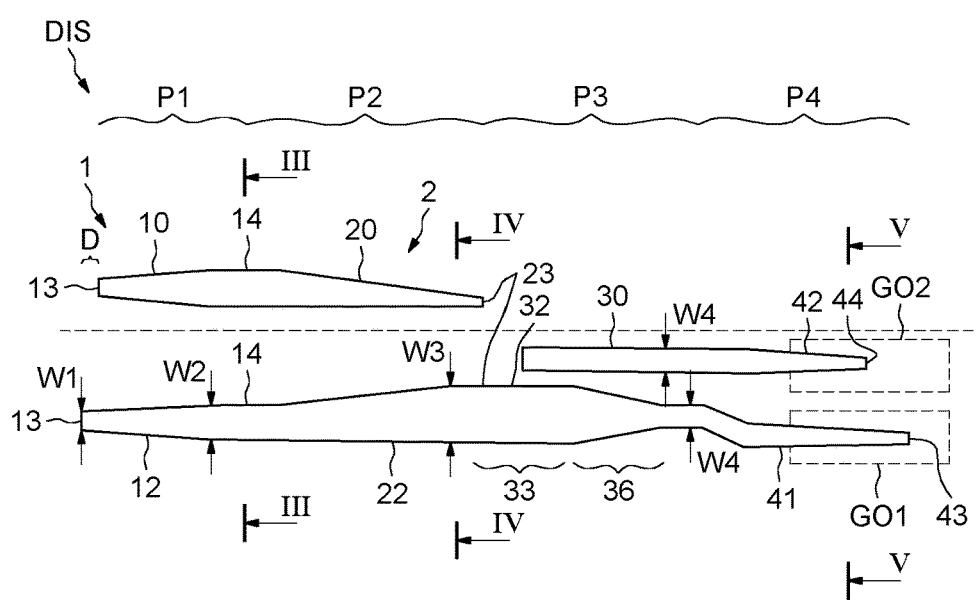
FIG. 2 illustrates in a schematic manner a coupling device.

FIG. 2 illustrates in a schematic manner the coupling device DIS according to one embodiment.

The device DIS comprises:
- a first portion P1, configured to receive the signal SIG,
- a second portion P2, configured to convert the transverse magnetic component of the signal SIG into a converted transverse electric component,
- a third portion P3 configured to separate the transverse electric component and the converted transverse electric component so as to switch the converted transverse electric component into a fundamental mode,
- a fourth portion P4 configured to transmit the transverse electric component and the converted transverse electric component to the two waveguides GO1 and GO2.

Figure 3:
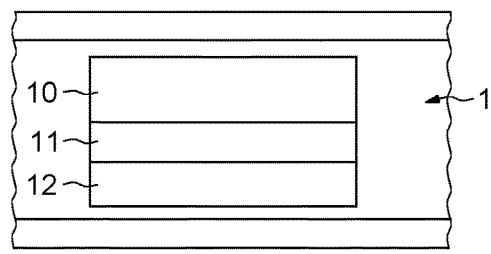
FIGS. 3-5 are sectional views of FIG. 2.

As illustrated by FIG. 2 and FIG. 3 which is a sectional view of FIG. 2 along the sectional axis III-III, the first portion P1 of the device DIS comprises a slot waveguide 1, that is to say a waveguide which comprises a stack of a first lower band 12, of a first intermediate band 11 and of a first upper band 10.

The first lower band 12 and the first upper band 10 are here bands of amorphous silicon each having a thickness of eighty nanometers.

The first intermediate band 11 is here a silicon nitride band having a thickness of forty nanometers. As a variant, it would be possible to have an intermediate band which is made of silicon dioxide or aluminum nitride.

The difference of thickness between the first intermediate band 11 and the first upper 10 and lower 12 bands, as well as the difference of optical index between the amorphous silicon and the silicon nitride allow the transverse magnetic component of the optical signal SIG travelling in the slot waveguide 1 to be more confined than if the signal were travelling in a conventional waveguide.

This makes it possible advantageously to limit the diffusion of the optical signal towards the buried insulating layer, and therefore to limit the optical losses.

The configuration of this first portion P1 is given by way of indication, the thickness of the first upper band 10 and of the first lower band 12 being able to lie between fifteen nanometers and one-hundred and twenty nanometers, and the thickness of the first intermediate band 11 being able to lie between twenty nanometers and eighty nanometers.

However, in order to optimize the confinement of the optical signal in the slot waveguide, it is advantageous to comply with a certain ratio between the thickness of the intermediate band layer and that of the upper and lower band layers. The person skilled in the art will know to choose this ratio as a function of the envisaged applications. That said, by way of indication this ratio may be of the order of 0.5.

The first lower band 12 comprises here a first end 13 at the level of the lateral face 7 of the integrated circuit CI, while the upper band 10 and the intermediate band 11 exhibit an offset D with respect to the first lower band 12, and do not therefore have an end at the level of the lateral face 7.

Here, the offset D is twenty-five micrometers, but could as a variant lie between zero and fifty micrometers.

The presence of an offset makes it possible advantageously to improve the optical coupling.

In this embodiment, the width of the slot waveguide 1 is increasing.

The waveguide 1 has a first width W1 equal to eighty nanometers at a first end 13 of the first portion, situated at the level of the lateral face 7 of the integrated circuit, and a second width W2 equal to five hundred nanometers at a second end 14 of the first portion.

This structure allows better transmission of the optical signal to the coupling device DIS and therefore a limitation of the optical losses.

By way of indication, the first width W1 can lie between sixty nanometers and two hundred nanometers and the second width W2 can lie between two hundred nanometers and one thousand five hundred nanometers.

In a particular case, the width of the first portion of the device 2 can be constant and the first width W1 and the second width W2 then being equal to two hundred nanometers.

Figure 4:
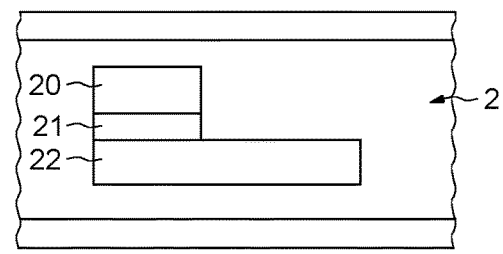

The second portion, of which FIG. 4 is a sectional view along the section line IV-IV of FIG. 2, comprises a polarization rotator 2, configured to convert the transverse magnetic component of the optical signal SIG into a converted transverse electric component.

The rotator 2 comprises a second upper band 20, a second intermediate band 21 and a second lower band 22, which are the prolongations respectively of the first upper band 10, of the first intermediate band 11 and of the first lower band 12.

Thus, the second end 14 of the first portion and the first end of the second portion are merged, and are designated in the figures by the same reference sign 14.

The second upper band 20 and the second intermediate band 21 have a decreasing width, so as to attain a width of eighty nanometers at a second end 23 of the second portion P2. By way of indication, this width could lie between sixty nanometers and two hundred nanometers.

The second lower band 22 has an increasing width, so as to attain a third width W3 at the second end 23 of the second portion P2, for example here a width of one micrometer. By way of indication, the third width W3 could lie between two hundred nanometers and one thousand five hundred nanometers.

Thus, the effective optical index, that is to say the mean optical index of that region of the device DIS in which the optical signal SIG travels (or stated otherwise, the optical index seen by the signal SIG) varies along the second portion P2 in such a way that the transverse magnetic component of the signal performs a rotation so as to be converted into a transverse electric component.

Thus, the propagation of the transverse magnetic component in the integrated circuit is avoided, and therefore also the losses engendered by its diffusion in the buried insulating layer, while preserving the corresponding optical power since it is propagated in a converted transverse electric form.

Here, the dimensions of the second portion P2 are chosen in such a way that the converted transverse electric component is not in its fundamental mode, so as not to interfere with the initial transverse electric component. Here, the converted transverse electric component is in a mode of order 1.

More precisely, to switch a signal from its fundamental mode to a higher-order mode, it is necessary for the geometry of the waveguide propagating the signal to vary along the waveguide in such a way that the effective index of the fundamental mode and of the higher-order mode of the signal in this waveguide correspond.

The third portion P3 comprises a third lower band 32, which forms a prolongation of the second lower band 22, and a lateral band 30 produced alongside the third lower band, here at a distance of four hundred nanometers.

The third lower band 32 comprises a first sub-portion 33 of constant width, and an intermediate sub-portion 36 of decreasing width so as to attain a fourth width W4 of four hundred and fifty-five nanometers. This intermediate portion 36 makes it possible to return to a width that is more appropriate for the propagation of the signal.

The width of the lateral band 30 is constant and equal to the fourth width W4.

The first portion 33 and the lateral band are thus configured to implement a directional coupling.

Here, the length of the first sub-portion 33 is chosen sufficiently short for the directional coupling to be able to occur once from the third lower band 32 to the lateral band 30 but not to be able to occur again in the reverse direction.

The third portion is thus configured to implement a directional coupling, of the converted transverse electric component between the third lower band 32 and the lateral band 30.

The dimensions of the lateral band are such that the converted transverse electric component travels therein in its fundamental mode.

Figure 5:
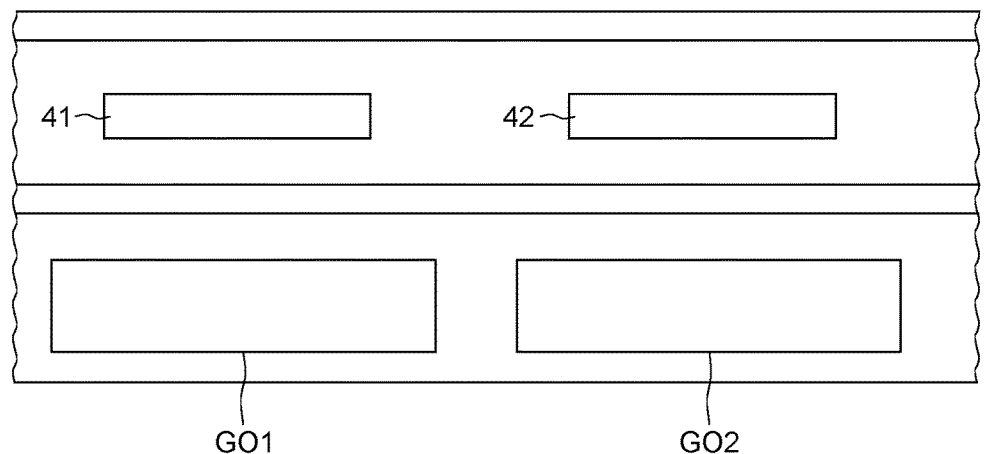

The fourth portion P4, of which FIG. 5 illustrates a sectional view along the section line V-V of FIG. 2, comprises the prolongations of the lateral band 30 and of the third lower band 32, which are prolonged into the fourth portion, forming respectively a first prolongation 41 and a second prolongation 42, which each extend partially above a distinct waveguide.

Here, the second prolongation 42 extends in the fourth portion P4 above the second waveguide GO2, and the first prolongation 41 extends in the fourth portion P4 above the first waveguide GO1, for example here over lengths of two hundred micrometers.

Thus, it is possible to transmit the transverse electric component to the first waveguide GO1, and the converted transverse electric component to the second waveguide GO2, and to use the optical powers in distinct photonic circuits.

The combining of the transverse electric component and of the converted transverse electric component, which could give rise to an optical power loss because of the interference between the two components, is thus circumvented.

The vertical distance separating the prolongations 41 and 42 from the two waveguides GO1 and GO2 is here two hundred and sixty nanometers, and the horizontal distance separating the two prolongations is of the order of ten micrometers.

These two distances are chosen so as to be able to implement an adiabatic coupling of the signal travelling in the prolongations 41 and 42 towards the waveguides GO1 and GO2.

Moreover to this end, the prolongations 41 and 42 exhibit decreasing widths, so as to each have a width of eighty nanometers at their respective ends 43 and 44.

Thus, the coupling device makes it possible to minimize the optical losses and can be produced by conventional methods since its dimensions, here a height of two hundred nanometers, do not involve modifying the dimensions of the other elements of the circuit, in particular the dimensions of the metal levels.

Furthermore, by converting the magnetic component into a transverse electric component, one circumvents the need to produce hardware components compatible with each of the components while safeguarding the power of both components.

Figure 6:
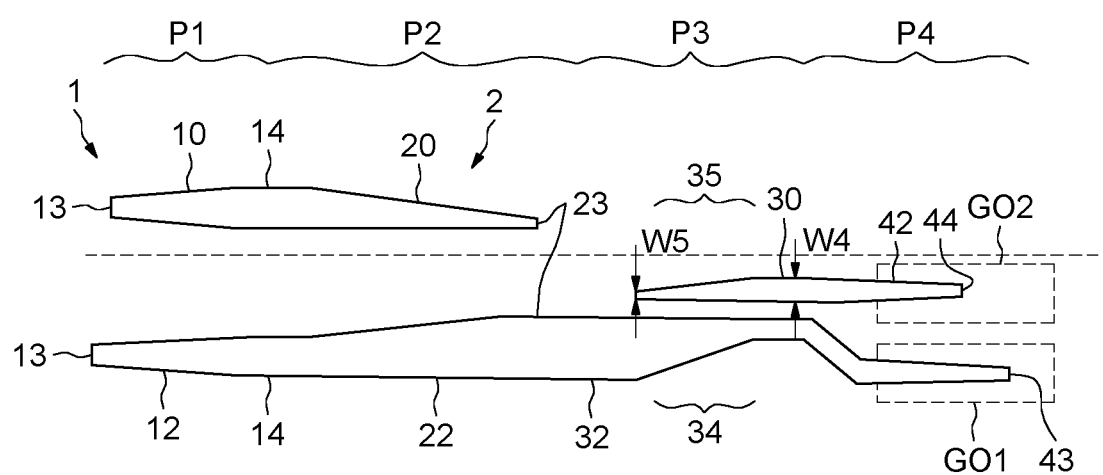
FIG. 6 illustrates a photonic integrated circuit.

FIG. 6 illustrates an embodiment in which the third lower band does not comprise an intermediate sub-portion but comprises a second sub-portion 34 of decreasing width, and the lateral band 30 of the third portion P3 comprises a third sub-portion 35 of increasing width, situated opposite the second sub-portion 34. Here, the third sub-portion 35 varies from an initial width W5 of eighty nanometers to the fourth width W4.

This advantageously allows the implementation of an adiabatic coupling between the third lower band and the lateral band of signals in a wider band of frequencies than in the case of the directional coupling previously described in conjunction with FIG. 2.

Indeed, as a function of the frequency of the optical signal, the coupling will occur earlier or later in the third portion P3, and will only be able to occur in just one direction.

The coupling device is thus independent of the frequency of the signal.

The invention claimed is:

1. A photonic device, comprising:
a first band made of amorphous semiconductor material and having a length extending from a first end to a second end;
an intermediate band made of insulating material; and
a second band made of amorphous semiconductor material and having a length extending from a third end to a fourth end;
wherein the intermediate band is stacked between and in contact with the first and second bands;
said first band having a width, wherein the width of the first band increases in a first part of the first band which extends from the first end to a first intermediate point and wherein the width of the first band decreases in a second part of the first band which extends from the first intermediate point to the second end; and
said second band having a width, wherein the width of the second band increases in a first part of the second band which extends from the third end to a second intermediate point and wherein the width of the second band further increases in a second part of the second band which extends from the second intermediate point to a third intermediate point located adjacent the second end of the first band.

2. The photonic device of claim 1, wherein the first end of the first band is offset in the direction of said length from the third end of the second band.

3. The photonic device of claim 1, wherein the amorphous semiconductor material is amorphous silicon.

4. The photonic device of claim 1, wherein the insulating material is selected from the group consisting of: silicon nitride, silicon oxide and aluminum nitride.

5. The photonic device of claim 1, wherein the first parts of the first and second bands form a slot waveguide configured to receive an optical signal.

6. The photonic device of claim 5, wherein the second parts of the first and second bands form a polarization rotator of the received optical signal.

7. The photonic device of claim 1, wherein the width of the second band decreases in a third part of the second band which extends from the third intermediate point to a fourth intermediate point.

8. The photonic device of claim 7, wherein the width of the second band remains constant in a fourth part of the second band which extends from the fourth intermediate point to a fifth intermediate point.

9. The photonic device of claim 8, wherein the width of the second band decreases in a fifth part of the second band which extends from the fifth intermediate point to the fourth end, and further comprising an optical waveguide positioned adjacent the fifth part of the second band.

10. The photonic device of claim 1, further comprising a lateral band made of amorphous semiconductor material and having a length extending from a fifth end to a sixth end, wherein the lateral band is positioned adjacent the second band extending from the third intermediate point to the fourth end.

11. The photonic device of claim 10:
wherein the width of the second band decreases in a third part of the second band which extends from the third intermediate point to a fourth intermediate point; and
wherein the width of the lateral band is constant in a first part of the lateral band which extends from the fifth end to a fifth intermediate point, said first part of the lateral band located adjacent the third part of the second band.

12. The photonic device of claim 11, wherein the width of the second band remains constant in a fourth part of the second band which extends from the fourth intermediate point to a sixth intermediate point, said first part of the lateral band located adjacent the fourth part of the second band.

13. The photonic device of claim 12:
wherein the width of the second band decreases in a fifth part of the second band which extends from the sixth intermediate point to the fourth end; and
wherein the width of the lateral band decreases in a second part of the lateral band which extends from the fifth intermediate point to the sixth end; and
further comprising:
a first optical waveguide positioned adjacent the fifth part of the second band; and
a second optical waveguide positioned adjacent the second part of the lateral band.

14. The photonic device of claim 10:
wherein the width of the second band decreases in a third part of the second band which extends from the third intermediate point to a fourth intermediate point; and
wherein the width of the lateral band increases in a first part of the lateral band which extends from the fifth end to a fifth intermediate point, said first part of the lateral band located adjacent the third part of the second band.

15. The photonic device of claim 14:
wherein the width of the second band remains constant in a fourth part of the second band which extends from the fourth intermediate point to a sixth intermediate point; and
wherein the width of the lateral band remains constant in a second part of the lateral band which extends from the fifth intermediate point to a seventh intermediate point, said second part of the lateral band located adjacent the fourth part of the second band.

16. The photonic device of claim 15:
wherein the width of the second band decreases in a fifth part of the second band which extends from the sixth intermediate point to the fourth end; and
wherein the width of the lateral band decreases in a second part of the lateral band which extends from the seventh intermediate point to the sixth end; and
further comprising:
a first optical waveguide positioned adjacent the fifth part of the second band; and
a second optical waveguide positioned adjacent the second part of the lateral band.

* * * * *